(12) United States Patent
Russell et al.

(10) Patent No.: US 11,717,896 B2
(45) Date of Patent: Aug. 8, 2023

(54) LOWER DRILL TOOL FOR PRECISION FORMING OF OPENINGS IN A BRACKET, AND METHODS OF USE

(71) Applicant: JR Automation Technologies, LLC, Holland, MI (US)

(72) Inventors: Joseph Robert Russell, Jenison, MI (US); Jason R. Turman, Grand Haven, MI (US); Ryan Nathan Anderson, Dayton, OH (US); Marcos Merino, Grand Rapids, MI (US); Gabriel C. Van't Land, Holland, MI (US)

(73) Assignee: JR Automation Technologies, LLC, Holland, MI (US)

( * ) Notice: Subject to any disclaimer, the term of this patent is extended or adjusted under 35 U.S.C. 154(b) by 240 days.

(21) Appl. No.: 17/169,986

(22) Filed: Feb. 8, 2021

(65) Prior Publication Data

US 2021/0245269 A1 Aug. 12, 2021

Related U.S. Application Data

(60) Provisional application No. 63/031,882, filed on May 29, 2020, provisional application No. 62/971,929, filed on Feb. 8, 2020.

(51) Int. Cl.
 *B23B 31/02* (2006.01)
 *B23B 39/16* (2006.01)
 (Continued)

(52) U.S. Cl.
 CPC ............. *B23B 31/028* (2013.01); *B21J 15/14* (2013.01); *B23B 31/1075* (2013.01);
 (Continued)

(58) Field of Classification Search
 CPC ...... B23Q 3/18; B23Q 3/183; B23Q 17/2216; B23Q 17/006; B23B 31/028; B23B 39/161; B23B 47/28
 See application file for complete search history.

(56) References Cited

U.S. PATENT DOCUMENTS

| 3,646,660 A | * | 3/1972 | Sheffer, Jr. ............... B21J 15/14 |
| | | | 29/243.53 |
| 5,458,443 A | | 10/1995 | Belge et al. |

(Continued)

FOREIGN PATENT DOCUMENTS

| CN | 104439425 A | 3/2015 |
| CN | 205614087 U | * 10/2016 |

(Continued)

*Primary Examiner* — Sunil K Singh
*Assistant Examiner* — Reinaldo A Vargas Del Rio
(74) *Attorney, Agent, or Firm* — The Watson IP Group, PLC; Jovan N. Jovanovic

(57) ABSTRACT

A lower drill tool that is structurally configured to receive a bracket, and, to cooperate with an upper drill tool having a pair of spaced apart drill bits. The lower drill tool has part receiving surface, a pair of spaced apart drill bores, a central bore, a centering nub and a biasing member. The drill bores extend downwardly away from the part receiving surface. The central bore is between the drill bores and extends downwardly away from the part receiving surface. The centering nub is slidable within the central bore, and has an upper tip extendable beyond the part receiving surface, positionable between an extended position and a partially retracted position. The upper tip has a conical configuration. The biasing member is positioned within the central bore and biases the centering nub toward the extended position. A drill system and a method are also disclosed.

20 Claims, 15 Drawing Sheets

(51) Int. Cl.
  *B23Q 17/00*   (2006.01)
  *B23Q 17/22*   (2006.01)
  *B23B 31/107*  (2006.01)
  *B23Q 3/18*    (2006.01)
  *B23B 51/10*   (2006.01)
  *B21J 15/14*   (2006.01)
  *B23P 23/04*   (2006.01)
  *B21J 15/02*   (2006.01)
  *B21J 15/30*   (2006.01)
  *B21J 15/32*   (2006.01)
  *B23B 35/00*   (2006.01)
  *B23Q 15/007*  (2006.01)
  *B23Q 16/00*   (2006.01)

(52) U.S. Cl.
  CPC .......... *B23B 39/161* (2013.01); *B23B 51/107* (2013.01); *B23P 23/04* (2013.01); *B23Q 3/18* (2013.01); *B23Q 3/183* (2013.01); *B23Q 17/006* (2013.01); *B23Q 17/2216* (2013.01); *B21J 15/02* (2013.01); *B21J 15/30* (2013.01); *B21J 15/32* (2013.01); *B23B 35/00* (2013.01); *B23Q 15/0075* (2013.01); *B23Q 16/00* (2013.01)

(56) References Cited

U.S. PATENT DOCUMENTS

2016/0193705 A1* 7/2016 Su ..................... B23Q 3/062
                                                       269/49
2022/0024000 A1* 1/2022 Yoshimi .................. B25B 5/16

FOREIGN PATENT DOCUMENTS

| | | | |
|---|---|---|---|
| CN | 205614087 U | 10/2016 | |
| DE | 202013005616 U1 * | 9/2013 | ............... B23Q 3/06 |
| SU | 876325 A1 | 10/1981 | |
| SU | 1404194 A1 | 6/1988 | |

* cited by examiner

LOWER DRILL TOOL FOR PRECISION FORMING OF OPENINGS IN A BRACKET, AND METHODS OF USE

CROSS-REFERENCE TO RELATED APPLICATION

This application claims priority from U.S. Provisional Patent Application Ser. No. 62/971,929 filed on Feb. 8, 2020, entitled "SYSTEM AND METHOD FOR COUPLING FASTENER HARDWARE TO A BRACKET", and claims priority from U.S. Provisional Patent Application Ser. No. 63/031,882 filed on May 29, 2020, entitled "SYSTEM AND METHOD FOR COUPLING FASTENER HARDWARE TO A BRACKET", the entire disclosure of which is hereby incorporated by reference in its entirety.

BACKGROUND OF THE DISCLOSURE

1. Field of the Disclosure

The disclosure relates in general to a drill assembly, and more particularly, to a lower drill tool that is utilized to dimensionally position brackets so as to make highly dimensionally precise openings therethrough, including an upper drill tool, a lower drill tool and a method use of the lower drill tool. An overall drill system is likewise disclosed.

2. Background Art

In many applications it may be necessary to join components together through a riveting operation. In one particular field of assembly, fastener hardware (including, but not limited to fastener hardware that is sometimes referred to as a nutplate) are utilized to join components. In such configurations, fastener hardware is riveted to brackets and then structures are attached to the fastener hardware.

The formation of rivet openings in brackets and the riveting of fastener hardware is often a labor intensive process. Additionally, for many assemblies, multiple quantities of fastener hardware are mounted to a single bracket and the process is repeated many times to make the overall assembly.

Problematically, it is often difficult to quickly and expeditiously form the openings for the rivets and to economically apply the rivets. In may applications it is necessary to provide openings with high dimensional precision. One such area is with the application of fastener hardware to brackets that are utilized in the aviation industry (as components of aircraft and the like). In such applications, the formation of openings through which rivets are applied are made with high precision. For example, the position and placement of the bracket typically requires high precision. At the same time, many of these brackets vary in size and shape and, in many instances the brackets are held in position by a user manually. Improper positioning when drilling, especially where a bracket requires multiple openings, a single incorrect opening (i.e., an opening that is not within the tight specifications) can render the entire larger bracket as scrap and unusable.

SUMMARY OF THE DISCLOSURE

The disclosure, in a first aspect, is directed to a lower drill tool that is structurally configured to receive a bracket, and, that is structurally configured to cooperate with an upper drill tool having a pair of spaced apart drill bits. The lower drill tool comprising a part receiving surface, a pair of spaced apart drill bores, a central bore, a centering nub and a biasing member. The pair of spaced apart drill bores are spaced apart from each other and extend downwardly away from the part receiving surface. The central bore is positioned between the pair of spaced apart drill bores and extends downwardly away from the part receiving surface. The centering nub is slidably positionable within the central bore. The centering nub includes an upper tip extendable beyond the part receiving surface, and positionable between an extended position and a partially retracted position. The upper tip extends beyond the part receiving surface in the extended position. In the partially retracted position, a portion of the centering nub that extends beyond the part receiving surface is positioned within the central bore. The upper tip has a conical configuration. The biasing member is positioned within the central bore, the biasing member biasing the centering nub toward the extended position.

In some configurations, the pair of spaced apart drill bores and the central bore are perpendicular to the part receiving surface. Each of the spaced apart drill bores and the central bore together define a central axis. The central axis of each defines a plane.

In some configurations, the upper tip comprises a frusto-conical configuration.

In some configurations, the centering nub is positionable so that the entirety of the upper tip is positioned within the central bore.

In some configurations, the pair of spaced apart drill bores are on opposite sides of the central bore and are equidistantly spaced from the central bore.

In some configurations, the biasing member comprises a compression spring that engages the centering nub and a lower end of the central bore to bias the centering nub into the extended position.

In some configurations, the lower drill tool has a side slot associated with each of the drill bores, the side slots being in fluid communication therewith.

In some configurations, the central bore includes an upper portion and a lower portion, with a cross sectional area of the lower portion being larger than a cross sectional portion of the upper portion. A shoulder spans therebetween, with the shoulder being spaced apart from an upper end and a lower end of the central bore. Additionally, the centering nub further comprises a central flange positioned between a lower stop and the upper tip. The central flange slidably movable into abutment with the shoulder. Abutment with the shoulder defines the extended position.

In some configurations, the biasing member has a first end interfacing with the lower end of the central bore, and a second end interfacing with the central flange to bias the centering nub in the extended position.

In some configurations, the biasing member comprises a compression spring extending about a lower portion of the centering nub, to the central flange.

In some configurations, the central bore includes a lower plug defining a lower end thereof.

In some configurations, the lower plug is threadedly coupled thereto.

In another aspect of the disclosure, the disclosure is directed to a drill system having an upper drill tool and a lower drill tool. The upper drill tool has a central chuck and a lower component. The central chuck has a chuck base and a pair of spaced apart chucks, each chuck structurally configured to retain a drill bit. The lower component has a central body having a drill bit bore corresponding to each of the pair of spaced apart chucks, to facilitate the passage of the drill bit therethrough. The bore terminates at a lower end of the central body. The lower drill portion includes a lower base and an upper portion. The lower drill tool that is structurally configured to receive a bracket, and, that is structurally configured to cooperate with an upper drill tool having a pair of spaced apart drill bits. The lower drill tool comprising a part receiving surface, a pair of spaced apart drill bores, a central bore, a centering nub and a biasing member. The pair of spaced apart drill bores are spaced apart from each other and extend downwardly away from the part receiving surface. The central bore is positioned between the pair of spaced apart drill bores and extends downwardly away from the part receiving surface. The centering nub is slidably positionable within the central bore. The centering nub includes an upper tip extendable beyond the part receiving surface, and positionable between an extended position and a partially retracted position. The upper tip extends beyond the part receiving surface in the extended position. In the partially retracted position, a portion of the centering nub that extends beyond the part receiving surface is positioned within the central bore. The upper tip has a conical configuration. The biasing member is positioned within the central bore, the biasing member biasing the centering nub toward the extended position.

In some configurations, at least one of the upper drill tool and the lower drill tool are spaced movable relative to each other so as to facilitate the retention of a bracket therebetween.

In some configurations, the lower drill tool has a sensor configured to sense relative slidable movement between the lower base and the upper portion of the lower tool.

In some such configurations, the pair of spaced apart drill bores and the central bore are perpendicular to the part receiving surface. Each of the spaced apart drill bores and the central bore defining a central axis, and the central axis of each being coplanar.

In some configurations, the central bore is centered between the pair of spaced apart drill bores.

In some configurations, the part receiving surface and the lower end of the central body each define a plane with the plane defined by the part receiving surface being parallel to the plane defined by the lower end of the central body.

In yet another aspect of the disclosure, the disclosure is directed to a method of using a drill system. The method includes the step of providing a drill system. The drill system includes a drill system having an upper drill tool and a lower drill tool. The upper drill tool has a central chuck and a lower component. The central chuck has a chuck base and a pair of spaced apart chucks, each chuck structurally configured to retain a drill bit. The lower component has a central body having a drill bit bore corresponding to each of the pair of spaced apart chucks, to facilitate the passage of the drill bit therethrough. The bore terminates at a lower end of the central body. The lower drill portion includes a lower base and an upper portion. The lower drill tool that is structurally configured to receive a bracket, and, that is structurally configured to cooperate with an upper drill tool having a pair of spaced apart drill bits. The lower drill tool comprising a part receiving surface, a pair of spaced apart drill bores, a central bore, a centering nub and a biasing member. The pair of spaced apart drill bores are spaced apart from each other and extend downwardly away from the part receiving surface. The central bore is positioned between the pair of spaced apart drill bores and extends downwardly away from the part receiving surface. The centering nub is slidably positionable within the central bore. The centering nub includes an upper tip extendable beyond the part receiving surface, and positionable between an extended position and a partially retracted position. The upper tip extends beyond the part receiving surface in the extended position. In the partially retracted position, a portion of the centering nub that extends beyond the part receiving surface is positioned within the central bore. The upper tip has a conical configuration. The biasing member is positioned within the central bore, the biasing member biasing the centering nub toward the extended position.

The method further comprises the steps of: coupling a pair of drill bits to the drill system; placing a bracket on the part receiving surface, the bracket having a central opening; directing the central opening to the centering nub; extending the centering nub through the central opening of the bracket; directing the lower end of the central body to the part receiving surface; contacting the bracket with the lower end of the central body; continuing to direct the lower end of the central body until the bracket is sandwiched between the lower end of the central body and the part receiving surface, to retain the same; and directing the centering nub into the central bore during the step of continuing to direct.

In some configurations, the method further includes the step of drilling a pair of openings through the bracket.

BRIEF DESCRIPTION OF THE DRAWINGS

The disclosure will now be described with reference to the drawings wherein.

DETAILED DESCRIPTION OF THE DISCLOSURE

Figure 1:
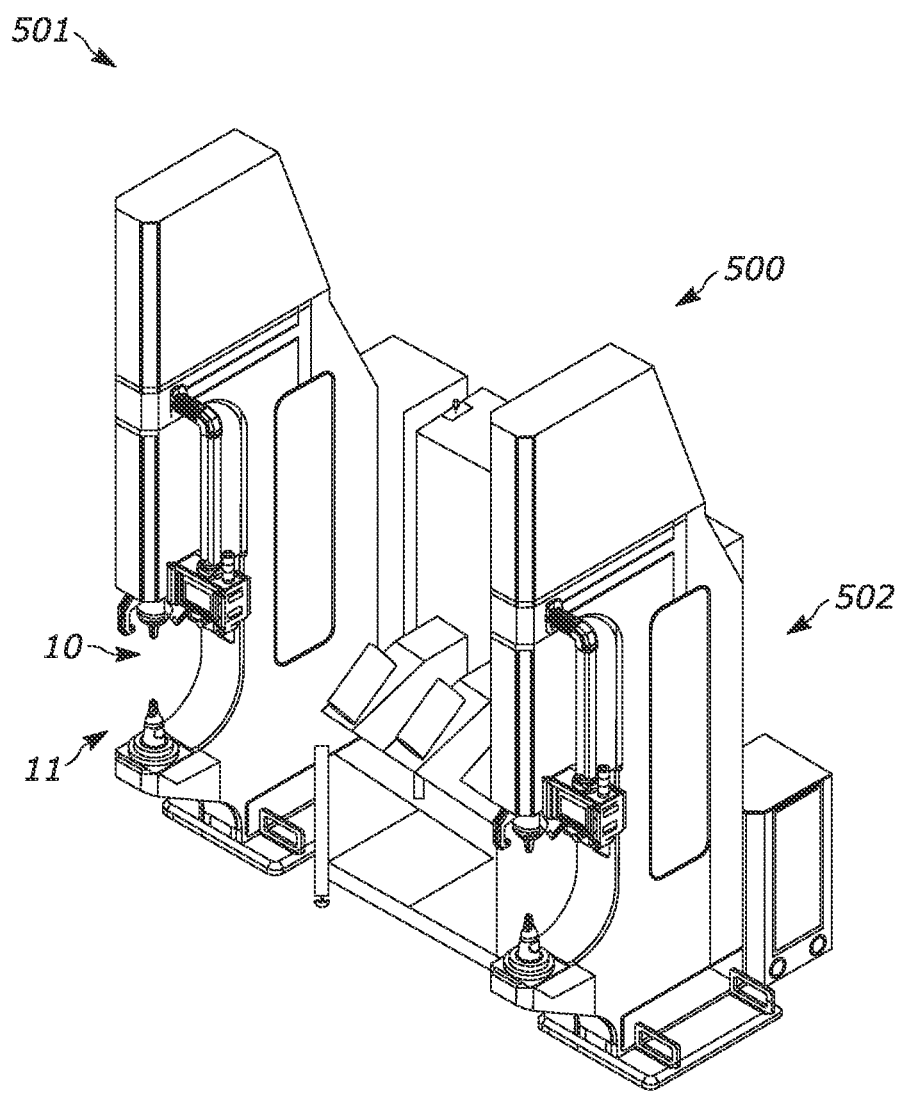
FIG. 1 of the drawings is a perspective view of the system having a drill portion and a fill portion.

While this disclosure is susceptible of embodiment in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Figure 2:
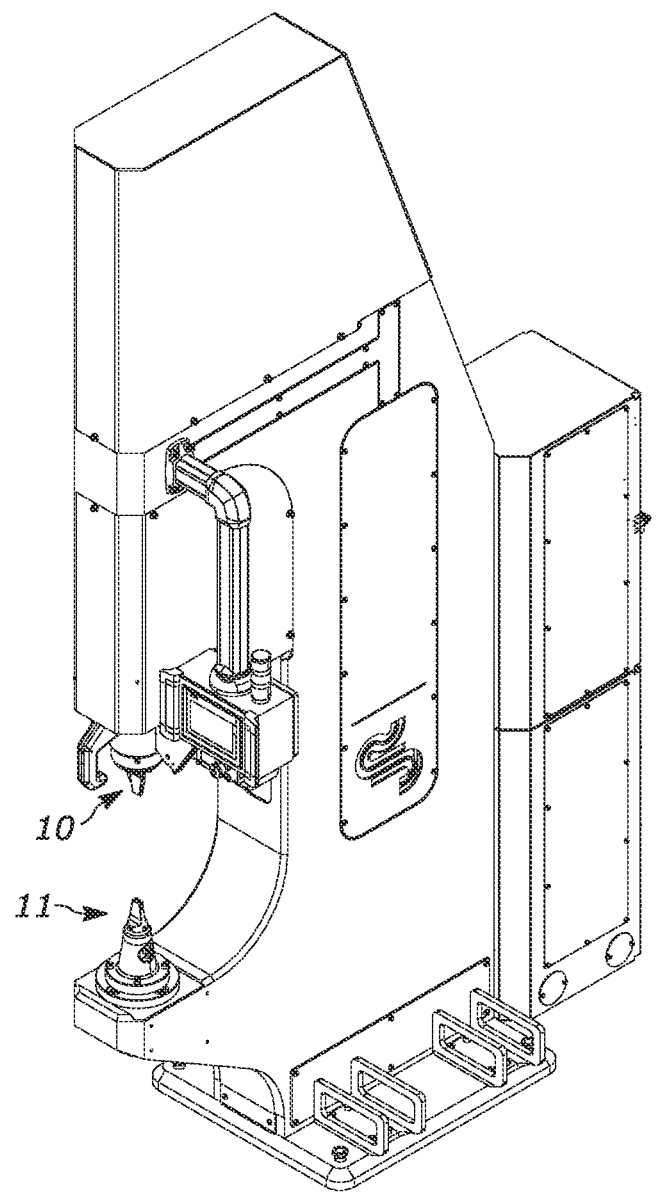
FIG. 2 of the drawings is a drill portion having the upper drill tool and lower drill tool of the present disclosure.
Figure 3A:
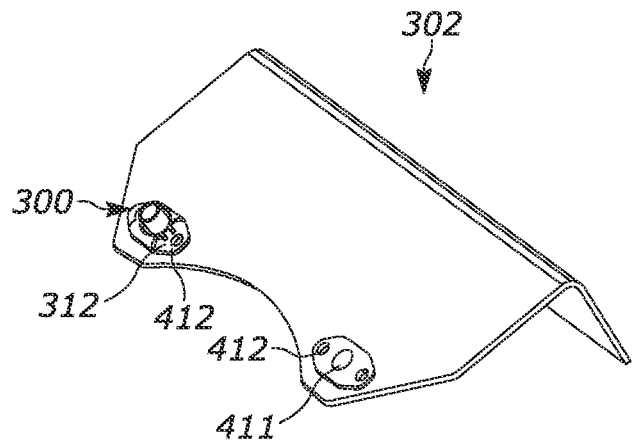
FIG. 3A of the drawings is a perspective view of a bracket having a hardware coupled thereto with a fastener.

Referring now to the drawings and in particular to FIGS. 1 and 2, the upper drill tool is shown generally at 10. In one application, the drill tool is configured to drill openings through a bracket, such as bracket 302 (FIG. 3A), while other uses are contemplated. In such a use, the upper drill tool 10 can be used in association with a lower drill tool, such as lower drill tool 11. With reference to FIG. 1, the upper and lower drill tool may be utilized in a larger system 500 which is configured with a drill portion 501 and a fill portion (i.e., riveting or joining portion) 502. The drill portion, also referred to as a drill system, generally provides for an upper portion to which the upper drill tool is coupled and moved vertically up and down toward and away from the lower drill tool. The upper portion may include motors and/or servos that can energize the chuck(s) (as will be described below) that are retaining the drill bit(s). The upper drill tool is not limited to use therewith.

Figure 3B:
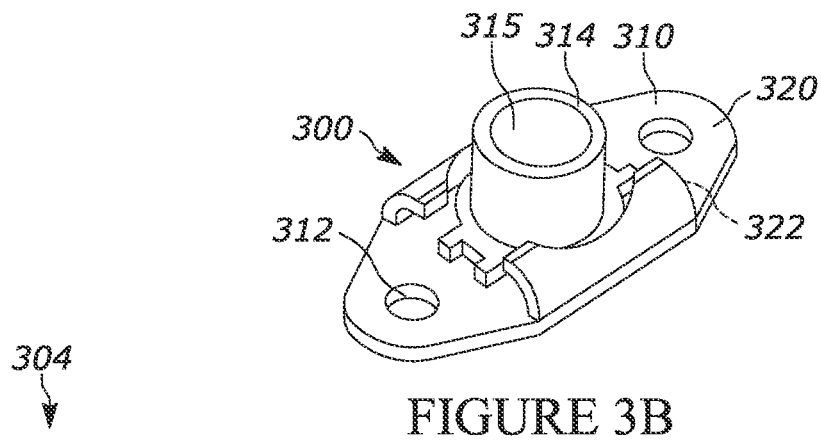
FIG. 3B of the drawings is a perspective view of the hardware shown in FIG. 3A.
Figure 3C:
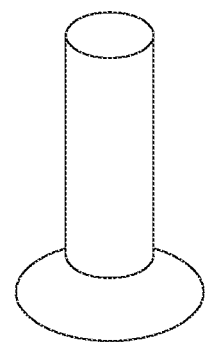
FIG. 3C of the drawings is a perspective view of a rivet utilized to couple the hardware to the bracket.
Figure 4:
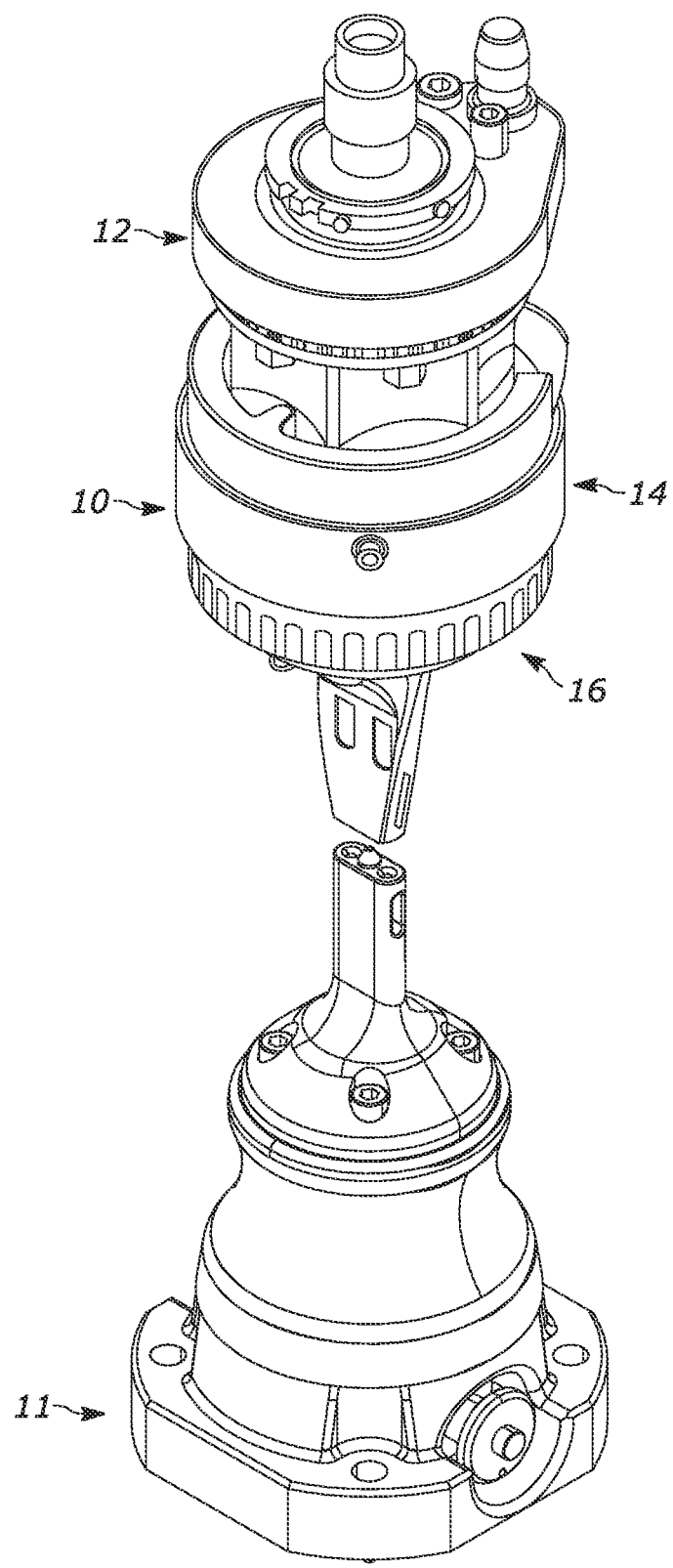
FIG. 4 of the drawings is perspective view of the upper drill tool and lower drill tool of the present disclosure.

In one instance, the upper drill tool is utilized in association with the preparation of openings in a bracket that can be utilized in the formation of structures utilized in aircraft structures. For example, these brackets (i.e., structural members such as beams or the like) can have hardware, such as hardware 300 (FIG. 3B), fastened to the bracket 302 utilizing rivets such as rivet 304 (FIG. 3C). The fastener hardware typically includes a base flange 310 having an upper surface 320 and a lower surface 322. A centrally located cylinder 314 extends from the upper surface 320 of the of the base flange and includes bore 315 extending therethrough. A pair of opposing rivet openings 312 are disposed on opposing sides of the centrally located cylinder. The bracket is coupled to fastener hardware which corresponding openings 412 and bore by extending rivets through the openings 312, 412 to couple the same together. To locate the openings, the bracket typically includes central opening 411 about which the openings for the rivets are drilled. It will be understood that a number of different configurations exist for the fastener hardware and the brackets. Additionally, it will be understood that the particular assembly of the present disclosure is not limited for use in association with such brackets, hardware or rivets.

The upper drill tool is not limited to use in association with the aviation industry, or in association with the drilling of openings through brackets, much less brackets of the type shown at bracket 302. The foregoing is meant to be exemplary and not limiting.

The upper drill tool 10 is shown, in greater detail, in FIGS. 4 through 8 as comprising, central chuck 12, upper component 14, lower component 16, and coupling assembly 18. The upper drill tool can be mounted to a movable structure such that the upper drill tool can be raised and lowered relative to a lower drill tool (FIG. 9) which may be fixed or movable). In the configuration shown in FIGS. 4 through 6 in greater detail, the upper drill tool can move linearly upwardly and downwardly toward and away from a lower drill tool 11.

Figure 9:
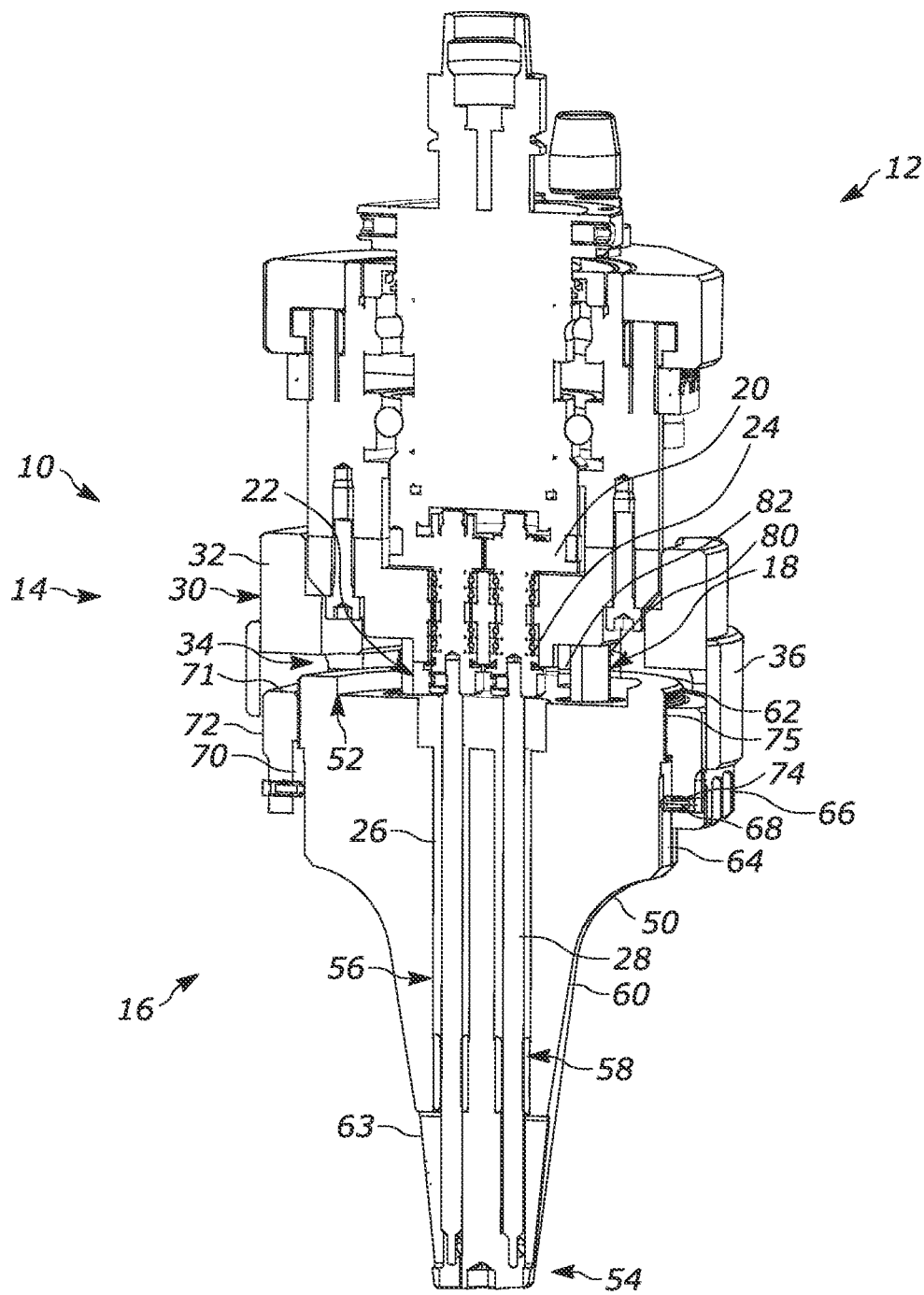
FIG. 9 of the drawings is a perspective cross-sectional view of the upper drill tool of the present disclosure, showing the drill tool in the first orientation (or away from the second orientation)
Figure 10:
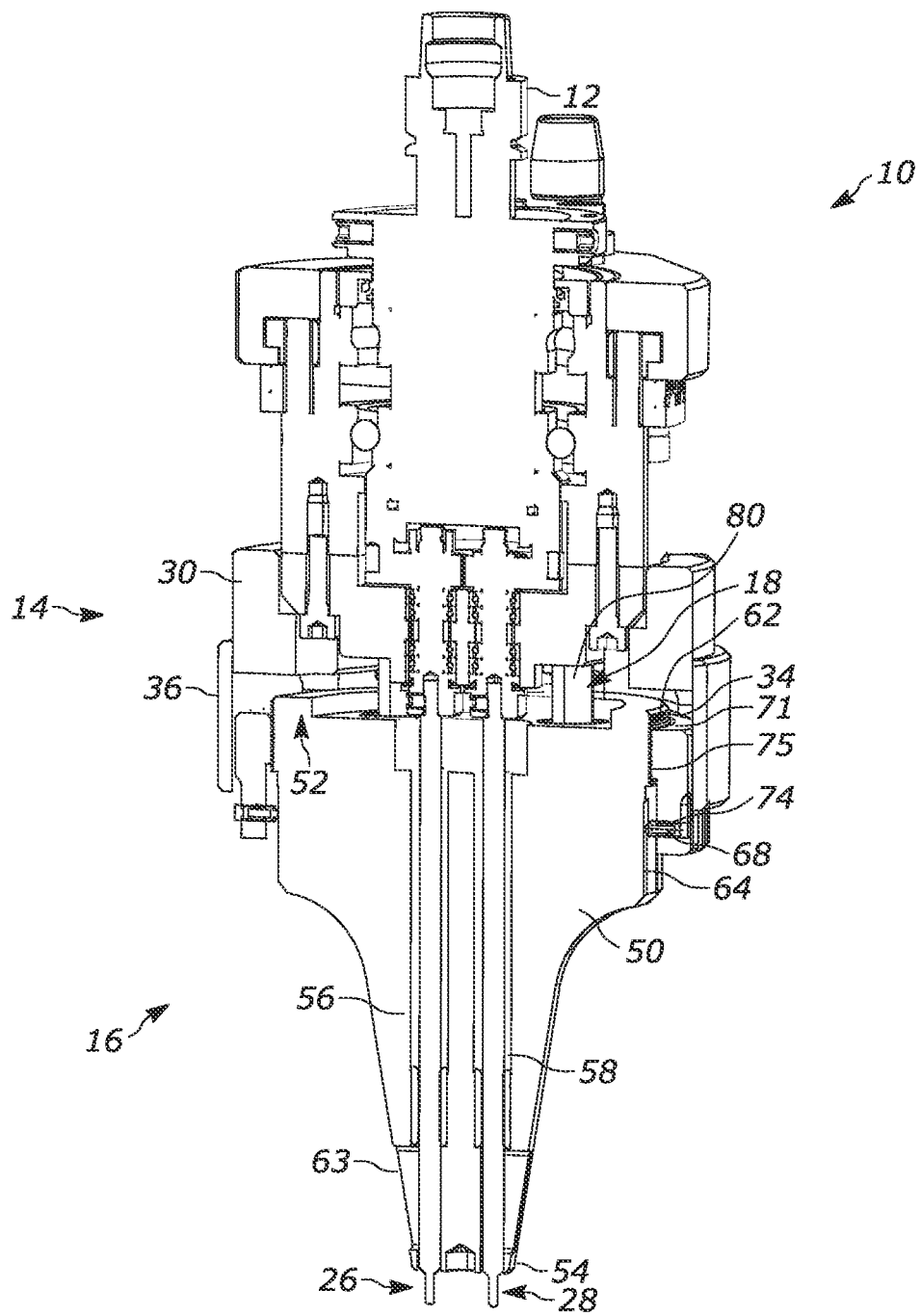
FIG. 10 of the drawings is a perspective cross-sectional view of the upper drill tool of the present disclosure, showing the drill tool in the second orientation.
Figure 11:
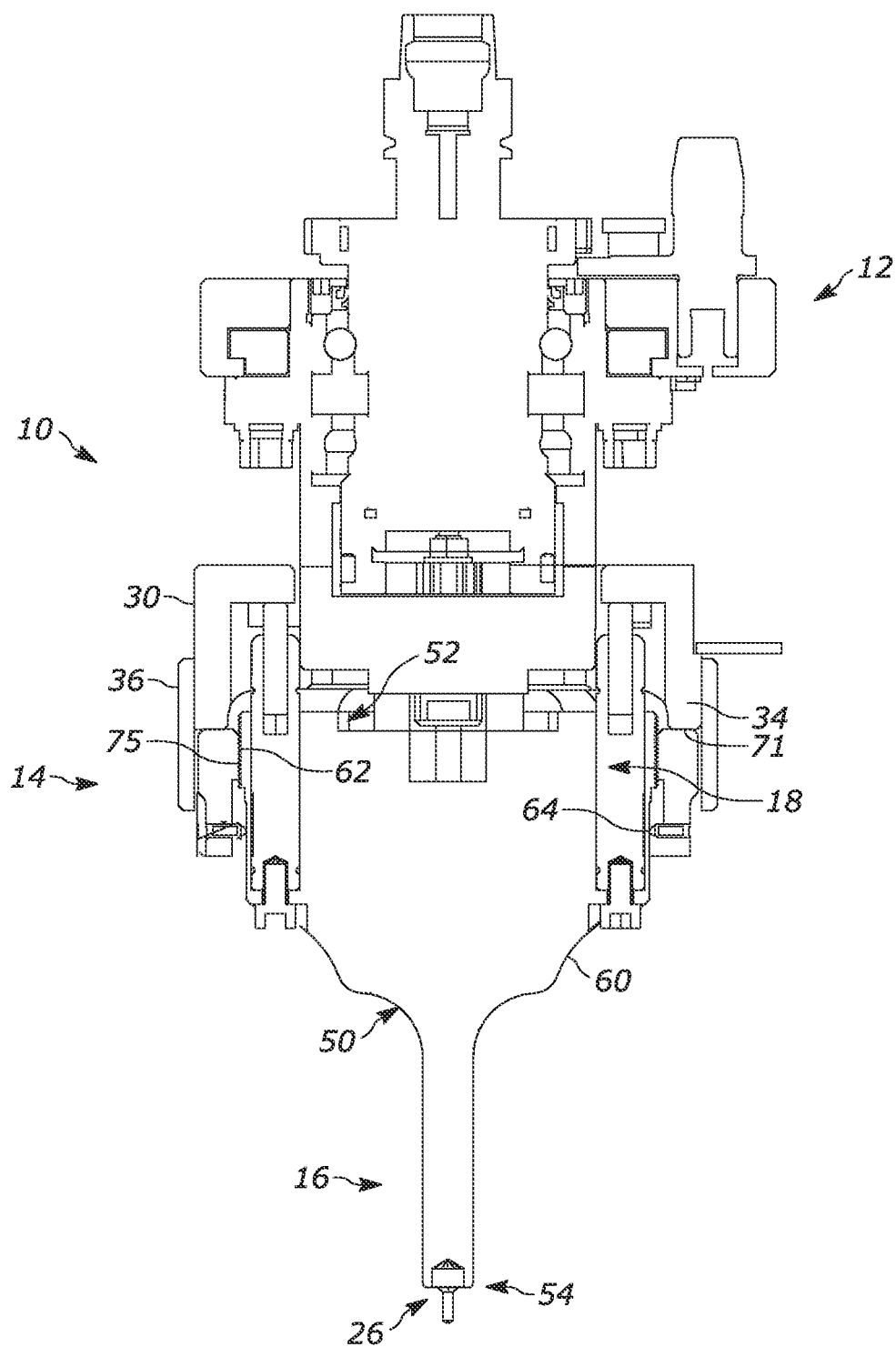
FIG. 11 of the drawings is a cross-sectional view of the upper drill tool of the present disclosure, showing the drill tool in the second orientation.
Figure 12:
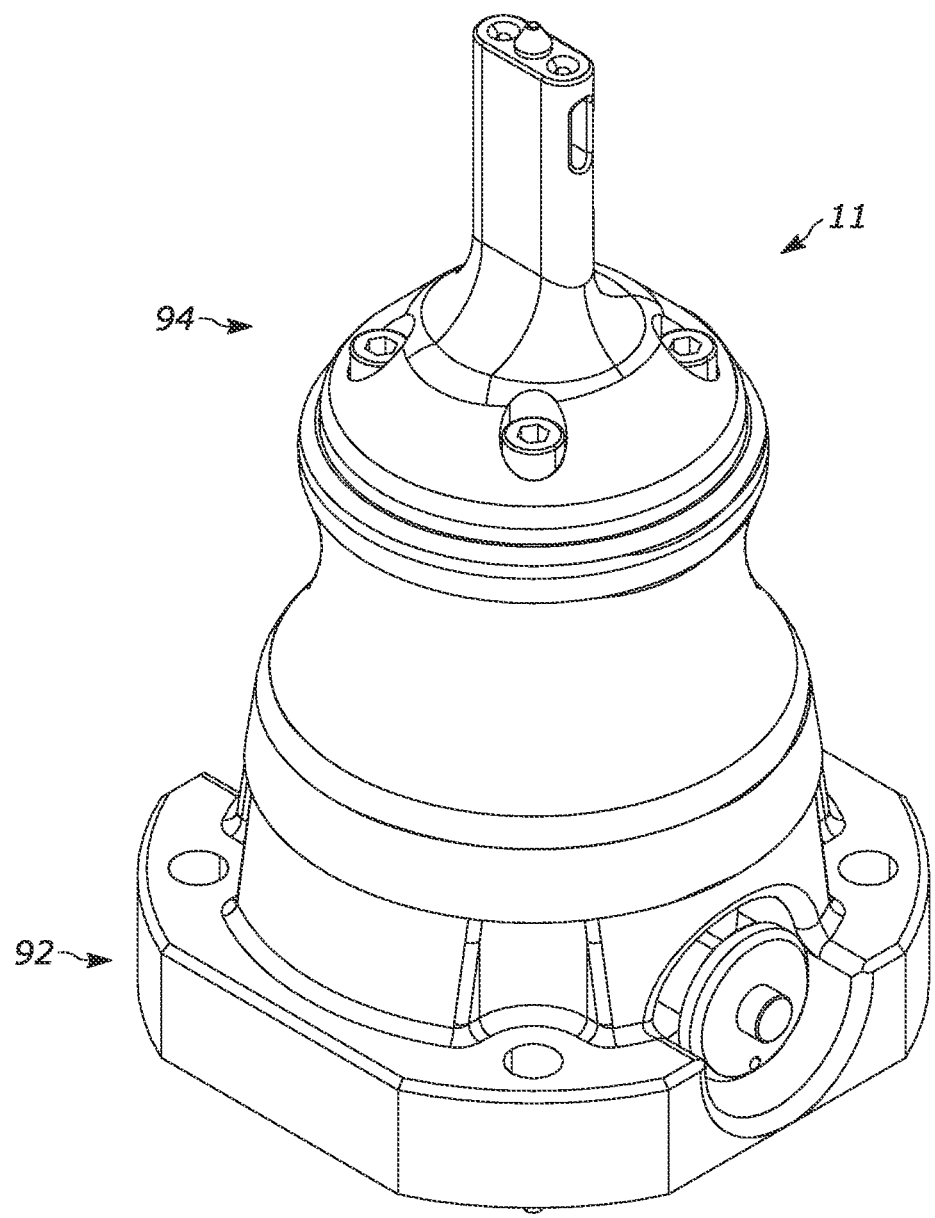
FIG. 12 of the drawings is a perspective view of the lower drill tool of the present disclosure.
Figure 13:
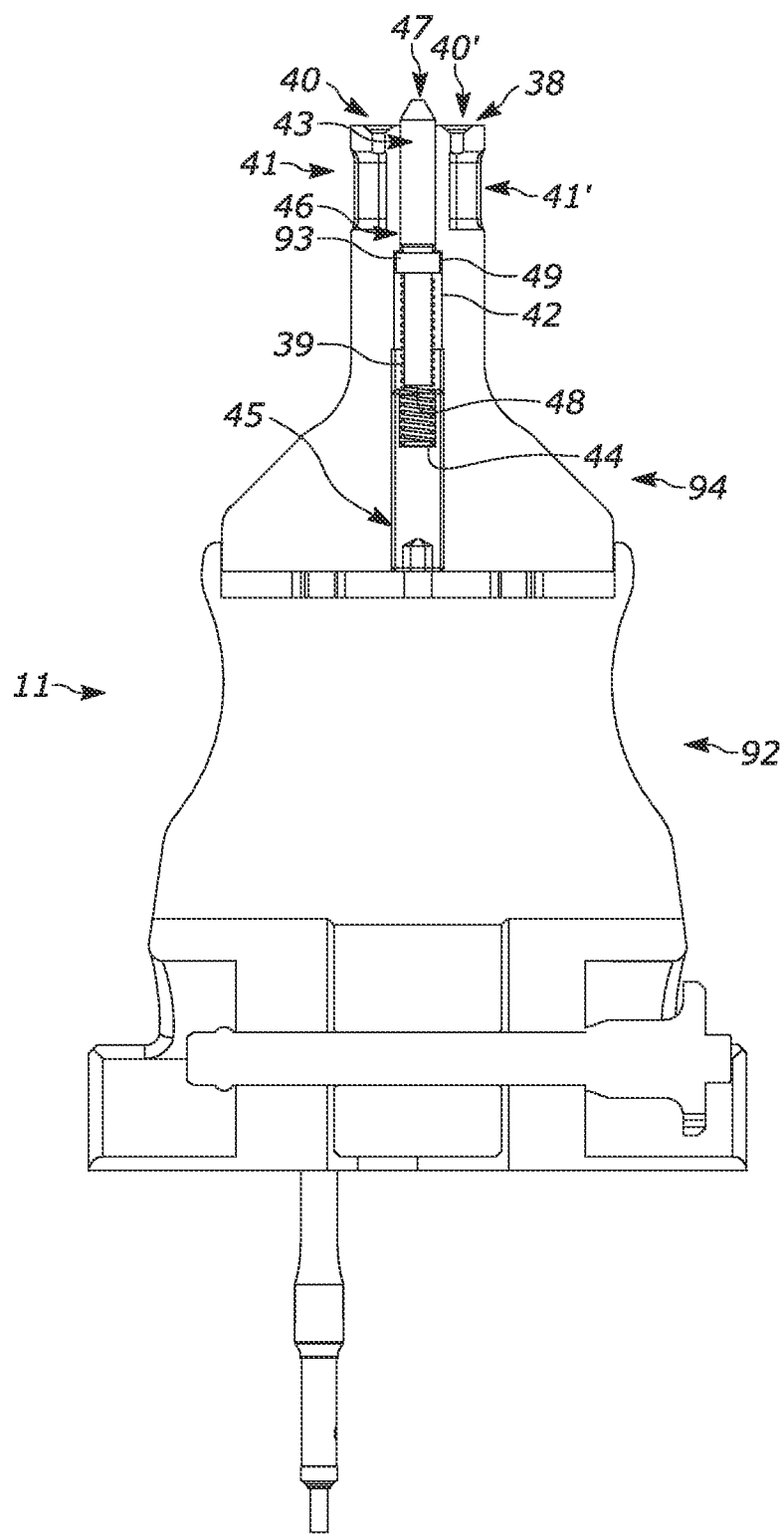
FIG. 13 of the drawings is a cross-sectional view of the lower drill tool of the present disclosure.

The central chuck 12, in the configuration shown in FIGS. 9 through 11, includes a chuck base 20 and a plurality of chucks that are configured to retain multiple chucks to hold a drill bit in each. In the configuration shown, a total of two side by side, spaced apart chucks are disclosed, namely first chuck 22 and second chuck 24 (that may be gear driven from a single powered shaft, for example). A first drill bit 26 is attached to (or attachable to) the first chuck 22. Similarly, a second drill bit 28 is attached to (or attachable to) the second chuck 28. It will be understood that the two chucks can rotate in unison (in the same or opposite direction) and that the chucks can be raised and lowered together with the entirety of the upper drill tool attached to a movable structure. The drill bits include a distal end which may comprise a drill bit having a countersink so as to form an opening with a chamfer or a counter sink. Other drill bits are contemplated for use, however, the disclosure is particularly useful for the drilling of openings that include a countersink or chamfered opening.

The upper component 14 is shown as comprising outer surround 30. The outer surround 30 is mounted to the central chuck 20 and generally surrounds the first and second chucks 22, 24. In the configuration shown, the upper component generally comprises a hoop-like cylindrical configuration. The outer surround 30 includes outer surface 32 that terminates at a lower stop surface 34. An outer shroud 36 depends from the outer surface of the outer surround and extends beyond the lower stop surface 34.

The lower component includes central body 50, outer ring 66 and locking tab 68. The central body 50 includes upper end 52, lower end 54, first drill bore 56, second drill bore 58 and outer surface 60. The drill bores extend from the upper end and terminate at the lower end and are aligned with the first and second chucks 22, 24 so as to allow the drill bits 26, 28 to extend therethrough and to be rotatable therewithin. Toward the lower end, opposing side slots 63 provide access to the lower end of the bores. Lubricant or other fluids can be directed into these slots so as to provide lubrication during the drilling process. Additionally, rear openings 65 (FIG. 8) may be present that provide a visual confirmation of the presence or absence of a drill bit, or the position of the drill bit. Such visual inspection can be made by a user manually, or thorough automated equipment.

The outer surface further includes threads 62 that extend about the central body toward the upper end 52 thereof. Additionally, a plurality of vertical channels or slots 64a are disposed at predetermined spaced intervals along the outer surface 60 of the central body, such that the threads are preferably positioned between the upper ends of the slots and the upper end 52 of the central body.

Outer ring 66 extends about the central body 60 proximate the upper end 52. The outer ring 66 includes inner surface 70, upper stop 71, outer surface 72 and bores, such as bore 74. The outer ring is configured so as to be able to nest within the outer shroud 36 of the outer surround 30. The upper stop 71 is configured to align with the lower stop surface 34 of the outer surround 30. Threads 75 are disposed on the inner surface 70 which matingly engage with the threads 62 of the outer surface of the central body. The bores extend axially through the outer ring at predetermined arcuate positions in a spaced apart orientation about the outer ring. Grasping channels or surfaces are disposed along the outer surface so as to facilitate grasping and retention of the same by the user.

A plurality of axially slidable, and inwardly biased, locking tabs 68 extend through the bores 74 so as to interface with the vertical channels 64 of the outer of the central body 50. It will be understood that the interface between the locking tabs 68 and the vertical channels 64 releasably secure the outer ring to the central body and preclude relative rotation therebetween. A user can overcome the biasing of the locking tabs and rotate the outer ring relative to the central body to translate one relative to the other about the interaction between threads 62 and threads 75. Relative movement in one direction traverses the outer ring along the central body in a first direction whereas relative movement in an opposite direction traverses the outer ring along the central body in a second direction.

The coupling assembly 18 is structurally configured to facilitate the slidable upward and downward movement of the lower component 16 relative to the upper component 14. In the configuration shown, the coupling assembly 18 includes slidable couplings, such as slidable couplings 80 and biasing members 82 which are configured to bias the lower component 16 away from the upper component 14. In the configuration shown, a total of four slidable couplings are provided, and a pair of gas elements to provide the downward biasing. These slidable couplings allow for vertical movement while precluding side to side movement or rotational movement relative to the chuck base.

Figure 5:
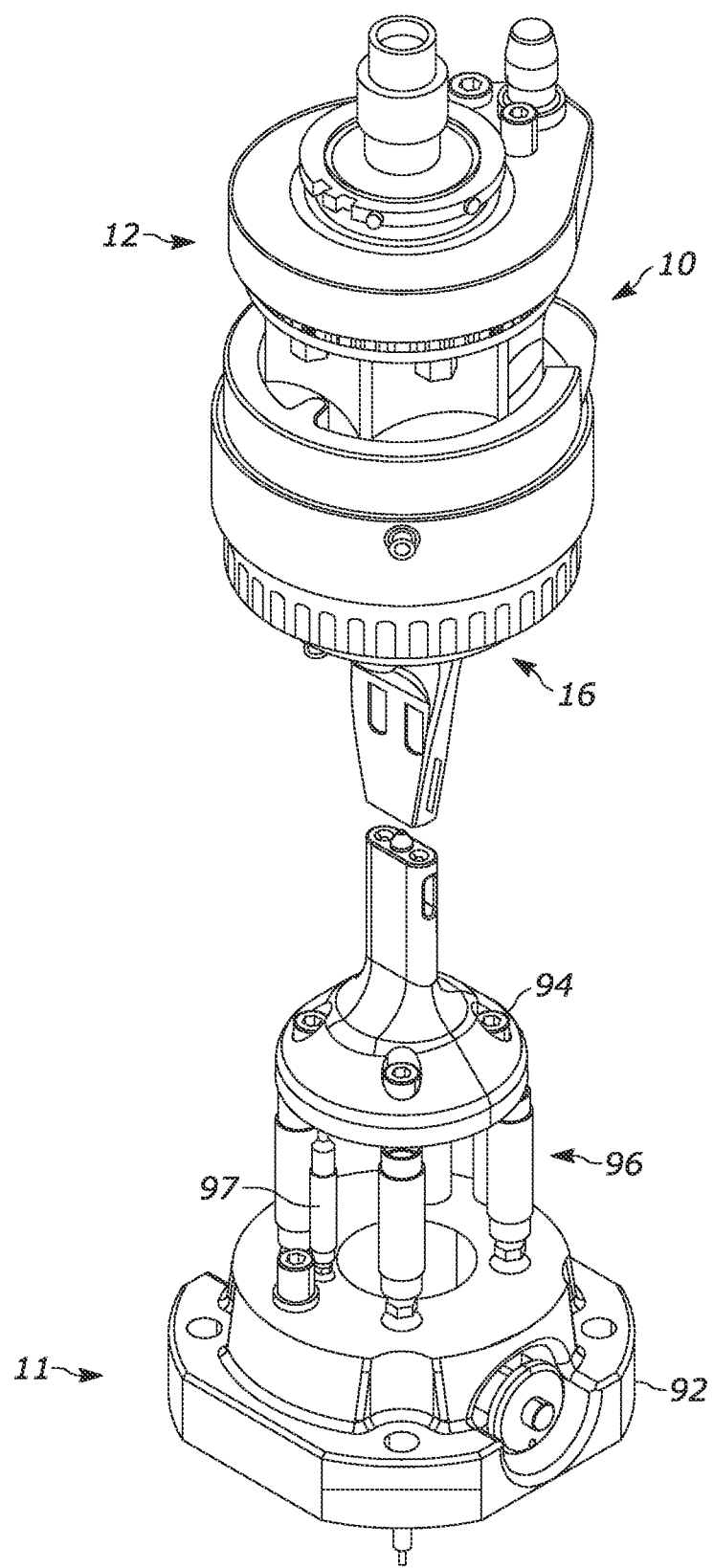
FIG. 5 of the drawings is a perspective view of the upper drill tool and lower drill tool of the present disclosure with the housing cover removed from a portion of the lower drill tool.
Figure 6:
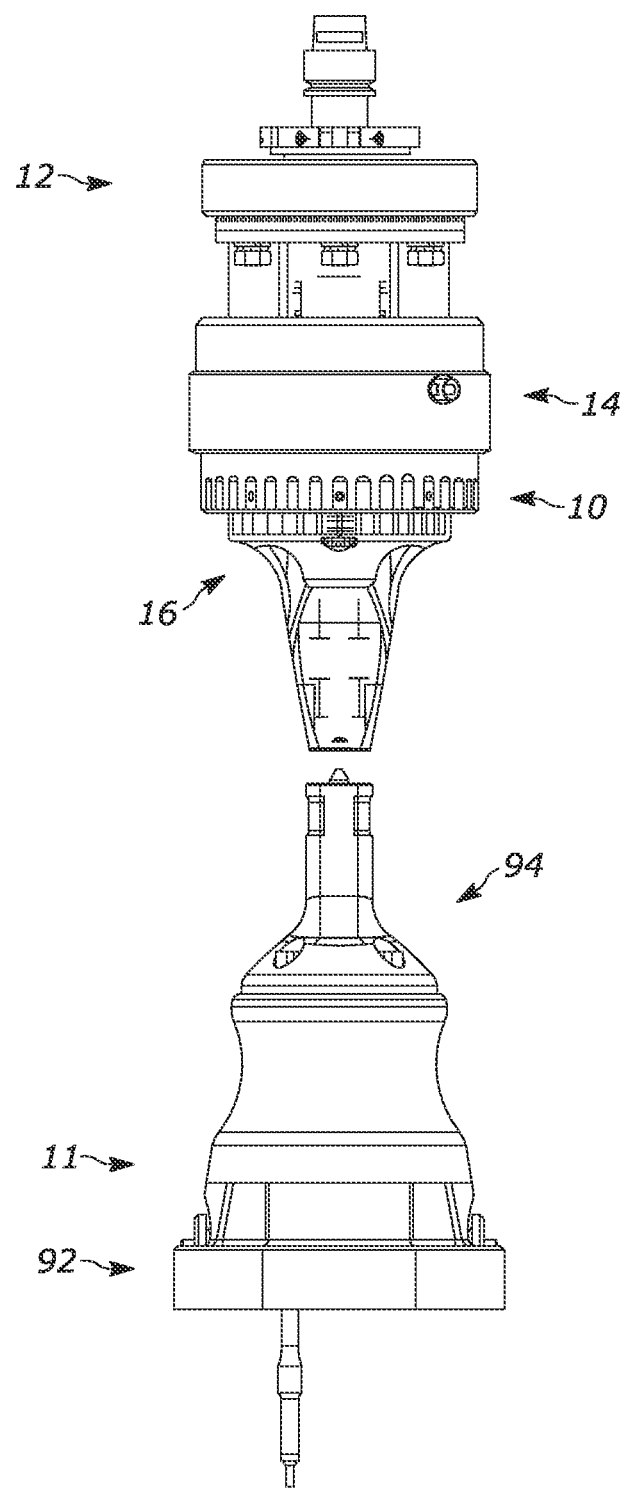
FIG. 6 of the drawings is a front elevational view of the upper drill tool and lower drill tool.
Figure 7:
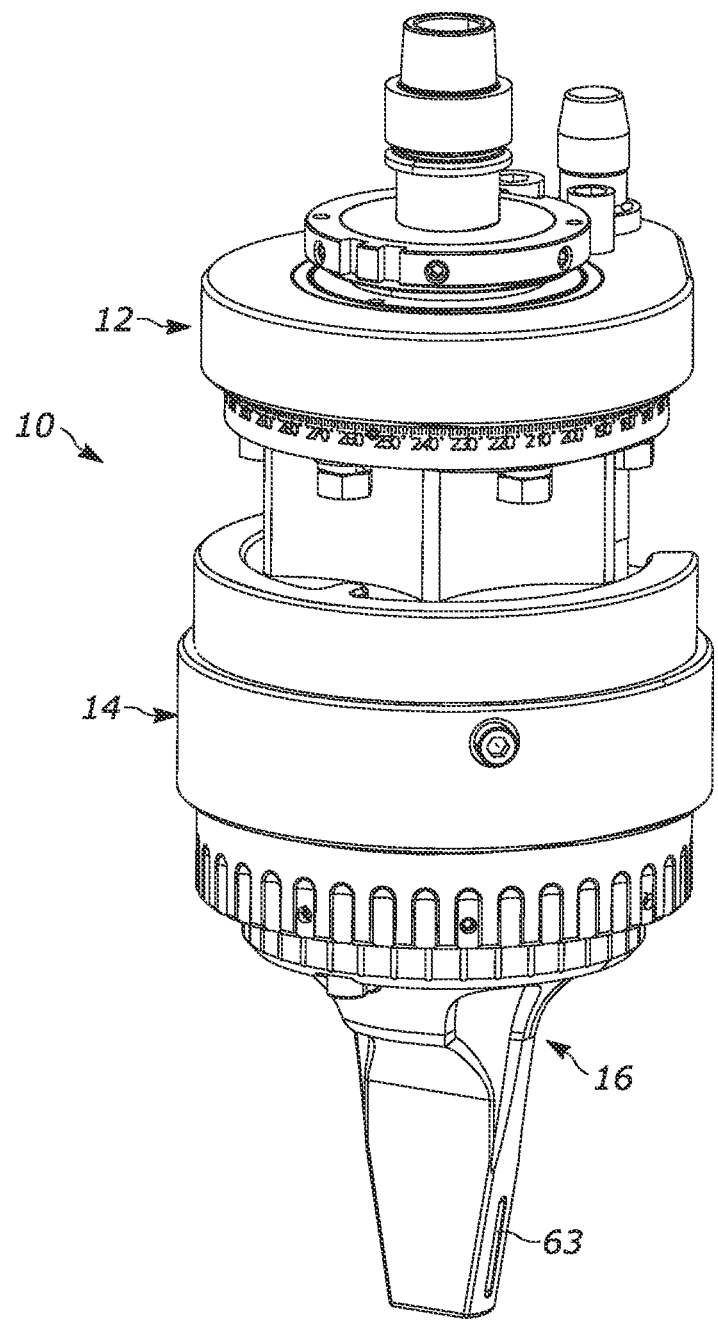
FIG. 7 of the drawings is a front perspective view of the upper drill tool of the present disclosure.
Figure 8:
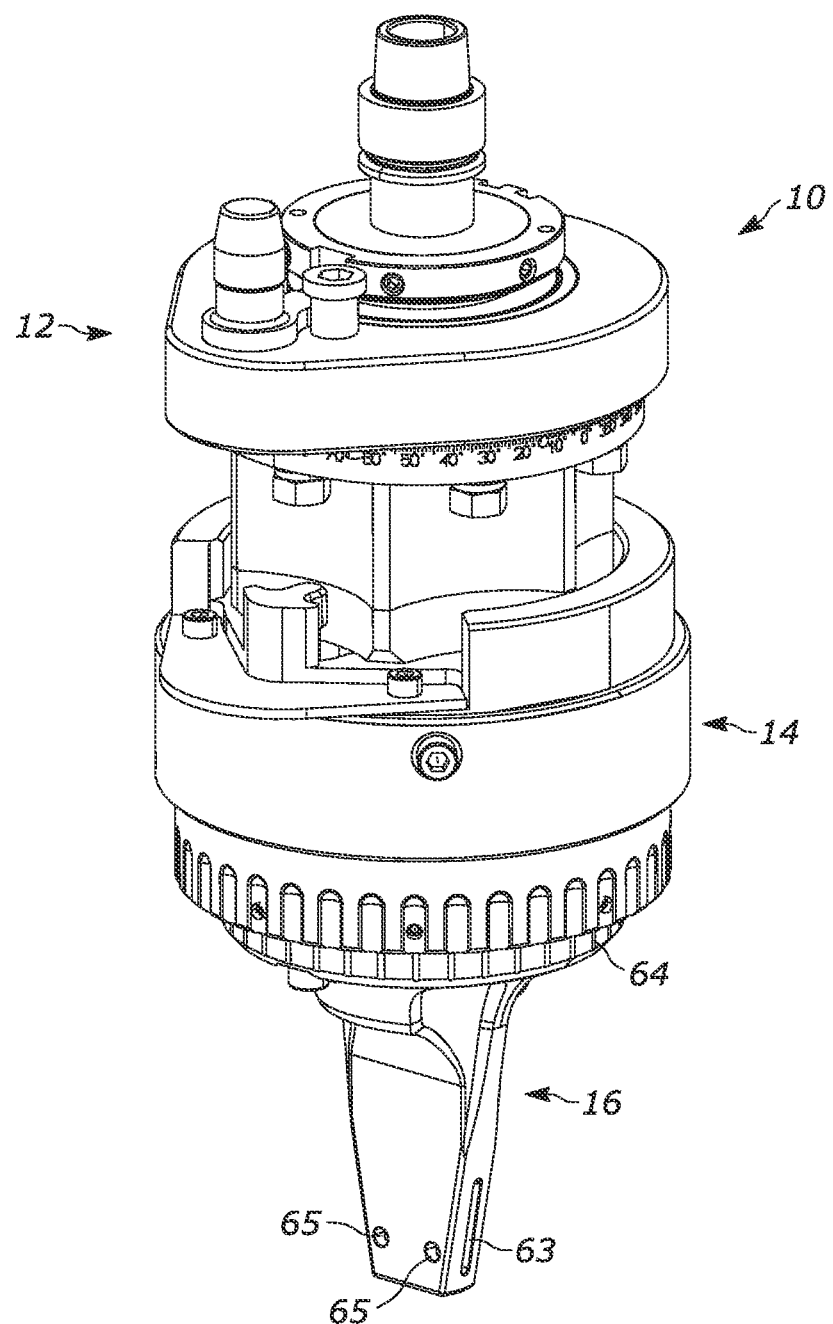
FIG. 8 of the drawings is a back perspective view of the upper drill tool of the present disclosure.

With reference to FIG. 5, the lower drill tool is shown generally at 11 as being in alignment with the upper drill tool. The lower drill tool includes lower base 92 and upper portion 94. The upper portion 94 is slidably mounted to the lower base 92. A lower biasing member 96 biases the upper portion 94 away from the lower base 92. The lower biasing member 96 directs a stronger biasing force of the upper portion 94 away from the lower base 92 than the force exerted by the biasing member 82 directing the lower component 16 away from the upper component 14. A sensor 97 (such as, for example) an LVDT, among other sensors is positioned within the lower drill tool to sense downward movement of the upper portion 94 against the lower base 92. As will be explained, such movement indicates that the lower component has bottomed out against the upper component 14 and that the drill bits have completed drilling.

Additionally, and with reference to FIGS. 12 through 15, the lower drill tool 11 is configured to assist with the proper positioning of the bracket so that the openings formed by the drill bits are within tolerance. Generally, for many of the contemplated applications, the position of the openings formed by the drill bit are referenced/measured from the center of a central opening that is configured to engage the centering nub. As such, to achieve the desired placement of these openings within the proper tolerances, proper centering of the central opening of the bracket to the centering nub, becomes the interfacing point, and in a significant manner one of the tolerance controlling interfaces.

In greater detail, the upper portion 94 of the lower drill tool includes upper surface, which comprises a part receiving surface, 38. A pair of opposing drill bit bores 40, 40' extend downwardly into the upper portion 94 in a spaced apart configuration. A pair of opposing slots 41, 41' extend from the drill bit bores 40, 40', respectively, generally perpendicular to the part receiving surface 38 (while variations are contemplated) so as to provide an outlet for chips or the like, as well as fluid and the like (air, lubricant, etc.), to exit from the drill bit bores 40, 40'. The upper end of the drill bit bores may be chamfered or otherwise countersunk relative to the part receiving surface 38. It will be understood that depending on the upper tool (and, in turn, the bracket, fastener, and/or rivet) that is to be utilized or worked upon, the orientation of the two drill bit bores may be varied as to opening size, depth, spacing, among other dimensions. Different lower tools may be provided that have different configurations of the two drill bit bores. Additionally, within the same tool, the drill bit bores may be identical, mirror images of each other in some configurations, while being dimensionally different in other configurations.

A central bore 42 is positioned between the opposing drill bit bores and extends into the upper portion 94. In the configuration shown, the longitudinal axis of each of the central bore 42, as well as the drill bit bores 40, 40' are substantially co planar, and parallel to each other, with the central bore being equidistant from each of the drill bit bores 40, 40'. The central bore includes an upper end 43 proximate the part receiving surface 38 and a lower end 44 spaced apart therefrom. In the configuration shown, the central bore is longer than either one of the drill bit bores. Amongst other variations, in some variations, the lower end 44 of the central bore may include a lower plug 45 that can be threadedly engaged into the central bore to form the lower end thereof. In other configurations, the lower end may be formed in other manners, including, for example, an interference fit, a threaded upper end, so that the lower end comprises a solid member, among others. Such a configuration allows for the assembly of the biasing member and the centering nub within the central bore.

In the configuration shown, the upper portion of the centering bore has a smaller cross-sectional area than the lower portion of the centering bore, with a shoulder 93 forming the transition therebetween. In the configuration shown, the shoulder defines a plane that is substantially parallel to the part receiving surface 38 and substantially perpendicular to the longitudinal axis of the central bore.

Figure 14:
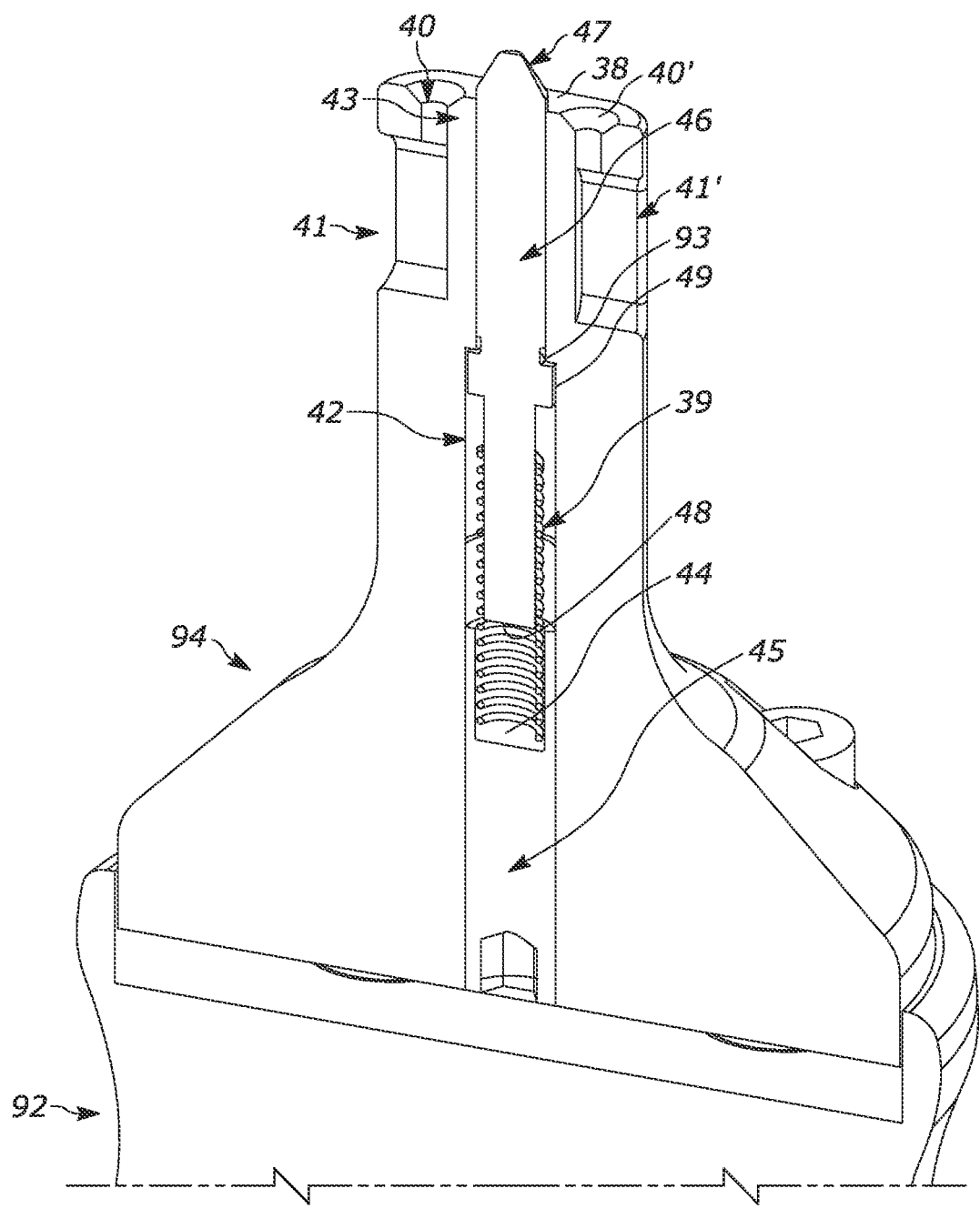
FIG. 14 of the drawings is a partial perspective cross-sectional view of the lower drill tool of the present disclosure, showing the centering nub in the extended position.
Figure 15:
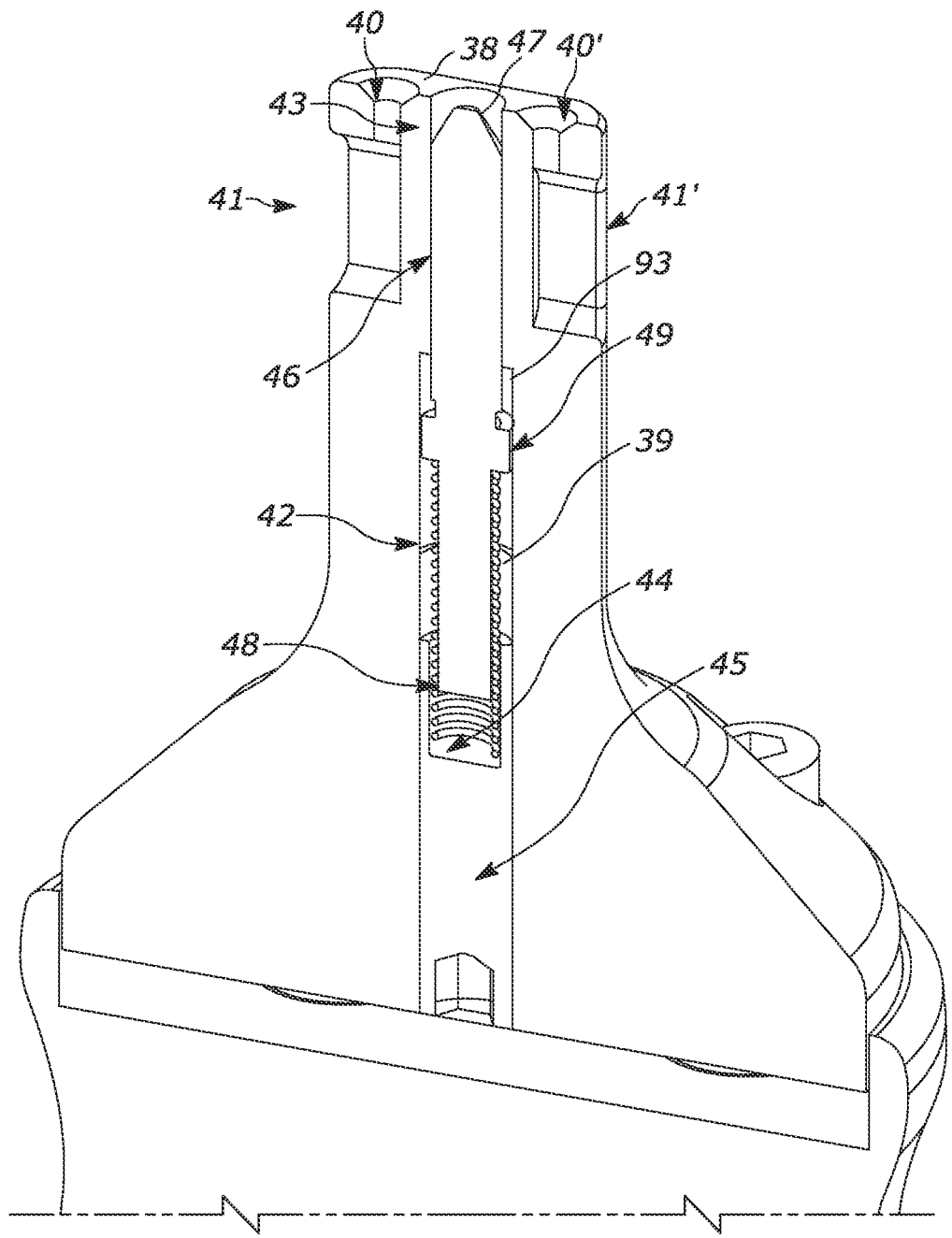
FIG. 15 of the drawings is a partial perspective cross-sectional view of the lower drill tool of the present disclosure, showing the centering nub in the partially retracted position, wherein the tip is substantially flush with the part receiving surface of the upper portion of the lower drill tool.

The centering nub 46 is shown in FIGS. 14 and 15 as comprising an upper tip 47, a lower stop 48 and a central flange 49. The centering nub is slidably positioned within the central bore 42 and is configured to slidably move therealong. The upper tip 47 comprises a right conical configuration. Regardless of its customary meaning, for purposes of the present disclosure, a right conical configuration shall include, without limitation, conical configurations, frusto-conical configurations, as well as polygonal pyramids that terminate in point or in a surface (i.e. a frusto-pyramid structure).

The central flange 49 is positioned between the upper tip and lower stop. The upper portion of the centering nub corresponds in cross-sectional area with the upper portion of the central bore. The central flange 49 is dimensioned so as to correspond in cross-sectional area with the lower portion of the central bore. As such, the shoulder 93 interfaces with the central flange 49 so as to limit the upward movement of the centering nub. The lower stop 48 is configured to contact the lower end of the central bore so as to limit the downward movement of the centering nub within the central bore. The uppermost position of the centering nub defines the first or extended position, with the lowermost position of the centering nub being the second or retracted position. Between these positions, is another position, the partially retracted position, wherein the centering nub is fully within the central bore and no portion thereof extends above the upper surface.

The biasing member 38 comprises a compression spring 39 having a bottom end interfacing with the lower end of the central bore and a top end interfacing with the centering nub 45. In the configuration shown, the compression spring 39 winds around the centering nub with the top end interfacing with the central flange 49. The biasing member 38 directs the centering nub toward the extended position, pressing the upper tip 47 through the upper end 43 of the central bore. It will be understood that the force exerted by the biasing member can be varied depending on the application.

In operation, the user first attaches the correct desired drill bits to the first chuck and the second chuck. In many aircraft applications, wherein fastener hardware is attached to a bracket with rivets, the openings formed in the bracket by the drill bits are chamfered or countersunk openings. And, the shape and depth of the countersink is dimensionally significant, having very tight tolerances. As such, the depth at which the drill bit extends through the bracket becomes a very tightly controlled operation to achieve such tolerances.

Once the drill bits are provided and the entire upper drill tool is attached to the press (FIG. 2), the user can determine the travel of the lower component 16 relative to the upper component 14 which determines the amount of the drill bits that extend beyond the lower end of the central body of the lower component, and, in turn, the interaction of the drill bit with the bracket. As the drill bits are longitudinally fixed to the chuck base and the upper component, as the lower component is directed toward the upper component, the lower end of the drill bits is directed toward the lower end of the central body of the lower component, and eventually beyond the lower end of the central body.

With reference to FIGS. 9 through 11, the movement of the lower component stops relative to the upper component when the upper stop 71 of the lower component contacts the lower stop surface 34 of the upper component. This defines the upper range of movement of the upper component relative to the lower component (i.e., the stroke). This, in turn, defines the depth of the drill bit (i.e., the amount of the drill bit that extends beyond the lower end of the central body of the lower component).

To adjust the amount of the protrusion of the drill bit beyond the lower end of the central body of the lower component, the user can rotate the outer ring relative to the central body. As noted above, rotating in a first direction adjusts the ring toward the upper end of the central body, and thereby, shortening the stroke of the lower component. A shorter stroke exposes less of the drill bits (and decreases the depth of the chamfer, on bits forming a chamfer). On the other hand, rotating the outer ring relative to the central body in a second direction (opposite of the first direction) directs the ring away from the top end of the central body, and thereby, increasing or lengthening the stroke of the lower component (and increasing the depth of the chamber, on bits forming a chamfer).

To facilitate controlled movement of the central body relative to the outer ring, as the user starts to apply force to rotate the outer ring relative to the central body, the user must first overcome the force of the locking tab against the vertical channels. The movement force directs the locking tabs to retract (overcoming the inward axial bias thereof) from within the respective vertical channels. Once the locking tabs have been pushed outwardly, further application of force will allow the ring to be rotated relative to the central body (which is precluded from rotation relative to the central chuck). The user can proceed through successive engagements and disengagements (i.e., interfaces) between the locking tabs with respective ones of the vertical channels until the desired stroke is reached (that is, the desired depth of protrusion of the drill bits beyond the lower end of the central body). In the configuration shown, the movement of a locking tab from a vertical channel to an adjacent vertical channel represents a change in the protrusion of the drill bits beyond the central body of one thousandth of an inch (with the understanding that it is a greater protrusion when relatively rotated in a first direction, and a lesser protrusion when relatively rotated in a second direction). Of course, the incremental rotations may adjust the stroke by more or less than one thousandth of an inch, and different increments are contemplated, both larger and smaller.

Once the desired stroke (i.e., distance that the drill bits extend beyond the lower end of the central body) has been set, the user is ready to drill and form openings in a bracket.

The user can position the bracket on the lower tool 11. The bracket is positioned so that the centering nub 46 extends through the central opening of the bracket. It will be understood that the centering nub is selected for use wherein the dimensions of the central opening are such that the central opening will engage the upper tip 47 (i.e., along the conical portion). As the central openings will vary slightly from central opening to central opening, within a certain tolerance range, the conical configuration of the upper tip ensures that the central opening will be centered about the centering nub and that the longitudinal axis of the centering nub aligns with the center of the central opening.

In many configurations, the user positions the bracket in the foregoing manner on the lower tool. The user can hold the bracket in such an orientation manually.

Initially, the upper tool 10 is directed in a downward direction toward the bracket positioned on the lower tool 11. Eventually, the bracket is reached and contacted. The upper tool pushes against the bracket and sandwiches the bracket between the upper tool and the lower tool (i.e., the part receiving surface 38 of the lower tool). Even as the sandwiching is occurring, the centering nub 46 is biased in an upward direction and maintains the lower bracket properly positioned and centered. Eventually, the bracket is held with significant force between the upper and lower tools and the centering nub is inwardly directed, while, until such time, the centering nub maintained the proper position of the central opening relative to the drill bits.

Continued movement eventually introduces the distal ends of the drill bits (which are spinning) to the bracket and the further movement forms the openings in the bracket. With reference to FIGS. 10 and 11, eventually, the upper stop 71 of the outer ring reaches and contacts the lower stop surface 34 of the outer surround 30. The drill bit is precluded from extending further beyond the lower end of the central body, and the openings have been completed (the end of the stroke has been reached).

Referring again to the configuration of the two tools in FIG. 5, any continued movement downward by the upper drill tool relative to the lower drill tool overcomes the lower biasing member 96 and the upper portion 94 of the lower tool begins to move relative to the lower base 92. The sensor senses this movement and directs the upper drill tool to stop moving in a downward direction. The upper drill tool can then retract completing the drilling of the openings.

In other configurations, the lower drill tool may be stationary, and the system can sense an increased current to the motors or servos that are directing the upper drill tool toward the lower drill tool. Once sensed, the upper drill tool can stop moving in the downward direction. The upper drill tool can then retract completing the drilling of the openings.

As to the upper tool, throughout the process, lubricant can be directed through the side slots 63 (FIGS. 7 and 8) to insure proper lubrication and cooling during the drilling operation. In addition, a sensor (optical, for example) can be directed toward the rear openings 65 (FIG. 8) to ensure that the drill bits are not broken, or damaged or missing, and may be utilized to determine the condition of the drill bits. Similarly, before, during and after the drilling operation, any chips or lubricant that enters into the drill bit bores 40, 40' of the lower drill tool can be directed outwardly through the side slots 41, 41'.

It will be understood that the upper and lower drill tools can be releasably coupled to the overall system of the drill portion (FIG. 2) or the overall system 500 (FIG. 1) Separate upper drill tools and lower drill tools may be utilized to provide for different pitch, opening size, opening depth, drill bit spacing among other differences. That is, the upper drill tool can be easily removed and replaced. And, the lower drill tool can be easily removed and replaced.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. A lower drill tool structurally configured to receive a bracket, and, structurally configured to cooperate with an upper drill tool having a pair of spaced apart drill bits, the lower drill tool comprising:
   a part receiving surface;
   a pair of spaced apart drill bores spaced apart from each other and extending downwardly away from the part receiving surface;
   a central bore positioned between the pair of spaced apart drill bores and extending downwardly away from the part receiving surface;
   a centering nub slidably positionable within the central bore, the centering nub including an upper tip extendable beyond the part receiving surface, and positionable between an extended position wherein the upper tip extends beyond the part receiving surface and at least a partially retracted position wherein a portion of the centering nub that extends beyond the part receiving surface is positioned within the central bore, the upper tip having a conical configuration; and
   a biasing member positioned within the central bore, the biasing member biasing the centering nub toward the extended position.

2. The lower drill tool of claim 1 wherein the pair of spaced apart drill bores and the central bore are perpendicular to the part receiving surface, with each of the spaced apart drill bores and the central bore defining a central axis, and the central axis of each defining a plane.

3. The lower drill tool of claim 1 wherein the centering nub of claim 1 wherein the upper tip comprises a frusto-conical configuration.

4. The lower drill tool of claim 1 wherein the centering nub is positionable so that the entirety of the upper tip is positioned within the central bore.

5. The lower drill tool of claim 1 wherein the pair of spaced apart drill bores are on opposite sides of the central bore and equidistantly spaced from the central bore.

6. The lower drill tool of claim 1 wherein the biasing member comprises a compression spring that engages the centering nub and a lower end of the central bore to bias the centering nub into the extended position.

7. The lower drill tool of claim 1 further comprising a side slot associated with each of the drill bores, the side slots being in fluid communication therewith.

8. The lower drill tool of claim 1 wherein:
   the central bore includes an upper portion and a lower portion, with a cross sectional area of the lower portion being larger than a cross sectional portion of the upper portion with a shoulder spanning therebetween, the shoulder being spaced apart from an upper end and a lower end of the central bore;
   the centering nub further comprises a central flange positioned between a lower stop and the upper tip, the central flange slidably movable into abutment with the shoulder, wherein abutment with the shoulder defines the extended position.

9. The lower drill tool of claim 8 wherein the biasing member has a first end interfacing with the lower end of the central bore, and a second end interfacing with the central flange to bias the centering nub in the extended position.

10. The lower drill tool of claim 9 wherein the biasing member comprises a compression spring extending about a lower portion of the centering nub, to the central flange.

11. The lower drill tool of claim 1 wherein the central bore includes a lower plug defining a lower end thereof.

12. The lower drill tool of claim 11 wherein the lower plug is threadedly coupled thereto.

13. A drill system having an upper drill tool and a lower drill tool, wherein
   the upper drill tool comprises:
      central chuck having a chuck base and a pair of spaced apart chucks, each chuck structurally configured to retain a drill bit;
      a lower component having a central body having a drill bit bore corresponding to each of the pair of spaced apart chucks, to facilitate the passage of the drill bit therethrough, the bore terminating at a lower end of the central body; and
   the lower drill portion comprises:
      a lower base;
      an upper portion mounted to the lower base, the upper portion including
         a part receiving surface;
         a pair of spaced apart drill bores spaced apart from each other and extending downwardly away from the part receiving surface, the pair of spaced apart drill bores corresponding to the drill bit bore of the lower component of the upper drill tool;
         a central bore positioned between the pair of spaced apart drill bores and extending downwardly away from the part receiving surface;
         a centering nub slidably positionable within the central bore, the centering nub including an upper tip extendable beyond the part receiving surface, and positionable between an extended position wherein the upper tip extends beyond the part receiving surface and at least a partially retracted position wherein a portion of the centering nub that extends beyond the part receiving surface is positioned within the central bore, the upper tip having a conical configuration; and a biasing member positioned within the central bore, the biasing member biasing the centering nub toward the extended position.

14. The drill system of claim 13 wherein at least one of the upper drill tool and the lower drill tool are spaced movable relative to each other so as to facilitate the retention of a bracket therebetween.

15. The drill system of claim 13 further comprising a sensor configured to sense relative slidable movement between the lower base and the upper portion of the lower tool.

16. The drill system of claim 13 wherein the pair of spaced apart drill bores and the central bore are perpendicular to the part receiving surface, with each of the spaced apart drill bores and the central bore defining a central axis, and the central axis of each being coplanar.

17. The drill system of claim 13 wherein the central bore is centered between the pair of spaced apart drill bores.

18. The drill system of claim 13 wherein the part receiving surface and the lower end of the central body each define a plane with the plane defined by the part receiving surface being parallel to the plane defined by the lower end of the central body.

19. A method of using a drill system comprising the steps of:
providing the drill system of claim 13;
coupling a pair of drill bits to the drill system;
placing a bracket on the part receiving surface, the bracket having a central opening;
directing the central opening to the centering nub;
extending the centering nub through the central opening of the bracket;
directing the lower end of the central body to the part receiving surface;
contacting the bracket with the lower end of the central body;
continuing to direct the lower end of the central body until the bracket is sandwiched between the lower end of the central body and the part receiving surface, to retain the same; and
directing the centering nub into the central bore during the step of continuing to direct.

20. The method of claim 19 further comprising the step of:
drilling a pair of openings through the bracket.

\* \* \* \* \*